Jan. 30, 1945.    J. C. SHARP    2,368,496
COOKING DEVICE
Filed Feb. 23, 1943
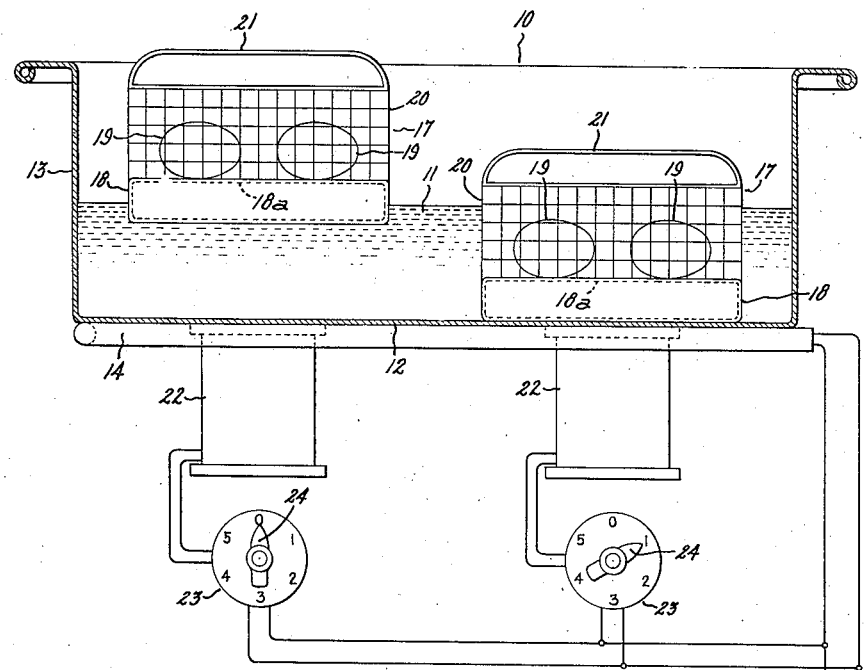
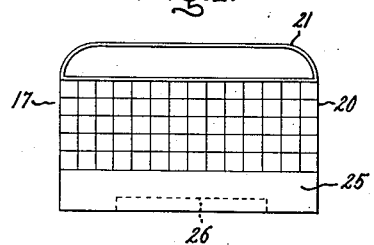
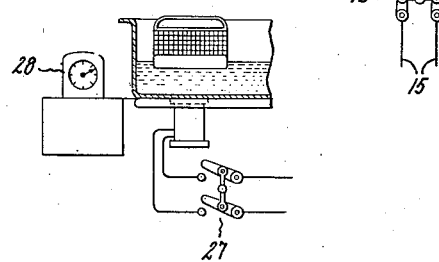
Inventor:
John C. Sharp,
by Harry E. Dunham
His Attorney.

Patented Jan. 30, 1945

2,368,496

UNITED STATES PATENT OFFICE 2,368,496

COOKING DEVICE

John C. Sharp, Glen Ellyn, Ill., assignor to Edison General Electric Appliance Company, Inc., Chicago, Ill., a corporation of New York Application February 23, 1943, Serial No. 476,866

3 Claims. (Cl. 99—336)

This invention relates to cooking devices, more particularly to cooking devices for cooking an edible by immersing it in a cooking liquid, such as an egg boiler, and it has for its object the provision of an improved device of this character.

In accordance with this invention, a vessel is provided for holding the cooking liquid. A buoyant support for the edible to be cooked is adapted to be inserted in the vessel and to float on the liquid so as to hold the edible above the liquid level. Suitable means are provided for holding the support in an immersed position in the liquid wherein the edible is immersed so as to be cooked. The holding means is controlled by means of a suitable control device to release the buoyant support. When the support is released it floats upwardly to remove the edible from the cooking liquid. This, of course, terminates the cooking operation.

In one form of this invention, a time element control device is used to effect the release of the holding means at the end of a preselected timed cooking period.

For a more complete understanding of this invention, reference should be had to the accompanying drawing in which Fig. 1 illustrates cooking apparatus embodying this invention, the cooking vessel of the apparatus being shown in section, and certain control elements for the cooking apparatus being shown schematically; Fig. 2 is an elevation of a buoyant edible support of modified form arranged in accordance with this invention; and Fig. 3 is a fragmentary view illustrating a modified form of this invention.

Referring to the drawing, this invention has been shown in one form as applied to cooking apparatus for boiling eggs. It will be understood, however, that it may be used to cook various other edibles which are cooked by immersing them in a cooking liquid.

The cooking device of Fig. 1 comprises a vessel 10 for holding the cooking liquid 11. The character of the cooking liquid will be determined somewhat by the nature of the edible to be cooked. In the case of eggs it will be water. Should it be desired to French-fry potatoes, onions or some other similar edible, the liquid preferably will be an oil which has a high boiling temperature.

The bottom wall 12 of the vessel 10 is made from a suitable non-magnetic material, such as aluminum. It is not necessary that the side walls 13 of the vessel be formed of a non-magnetic material, but in the interests of economy and ease in manufacturing it is preferable to form the side walls 13 of the same material as the bottom wall, and integrally with it, as shown.

The liquid within the vessel 10 may be heated by any suitable means, but preferably it will be heated by a heating element 14 of the sheathed type positioned against the outer surface of the bottom wall 12, as shown. This heating element 14 will be energized from any suitable source of electrical supply 15, and its energization may be controlled by a suitable manually operable switch 16.

Adapted to be inserted in the cooking vessel 10 are a plurality of food supports 17. Each food support 17 comprises a base 18 which is hollow. The top wall 18a of the base constitutes a supporting surface for the eggs 19 to be cooked. A side, mesh-like retaining wall 20 is provided for holding the eggs upon the surface 18a. The food supports further comprise handles 21.

The hollow base 18 is proportioned to give the support 17 sufficient buoyancy so that when it is inserted in the cooking vessel 10, the surface 18a will be elevated above the free liquid level of the cooking medium 11; the left-hand support of Fig. 1 is illustrated in this elevated position.

Suitable holding means are provided for holding the buoyant edible supports 17 down against the bottom wall 12 in order to immerse the eggs 19 so that they may be cooked by the cooking liquid. For this purpose, a pair of suitable cooperating magnetic elements are provided for each support, one secured to the edible support, and the other placed under the bottom wall 12. In the form of the invention shown in Fig. 1, the base 18 constitutes one of the magnetic elements; it is formed of a suitable magnetic material, such as a magnetic stainless steel. The other magnetic element is in the form of an electromagnet 22 placed under the bottom wall 12 so that its pole is mounted closely to the bottom wall, as shown in Fig. 1. When the electromagnet is energized and the edible support 17 is depressed in order to bring the base 18 into magnetic relation with the magnet 22 the magnet will attract and hold the base against the bottom wall 12, as is the case of the right-hand edible support shown in Fig. 1. This is the cooking position of the edible support.

The cooking will continue until the controlling electromagnet is deenergized to release the magnetic base 18, and thereby permit the support 17 to move up to its initial position wherein the edible is removed from the cooking liquid.

In the form of the invention shown in the drawing, the energization of each electromagnet is controlled by means of a suitable elapsed time switch 23 which is electrically connected in the energizing circuit of the magnet, as shown. While the magnets may be energized from a source of supply separate from the heating element supply source 15, preferably and as shown they will be energized from this same source, and also preferably their energizing circuits will be controlled by the manually operable switch 16.

The construction and arrangement of the time switches 23 form no part of the present invention, and they may be of any conventional type which have a control member that is manually operable from an "off" position to an "on" position, and wherein the duration of the timed period is set by the extent of movement from the "off" position, and further wherein the control member is driven back to its "off" position to open the switch at the end of the selected time period. The control members of the switches 23 are indicated by the numeral 24. The left-hand switch 24 is in its "off" position, and hence its electromagnet 22 is deenergized and the associated edible support 17 is in its upper noncooking position. The right-hand switch control arm 24, however, has been moved from its "off" position, and hence has energized its electromagnet 22 and has preset it to remain energized for a predetermined period. Thus, here when the right-hand edible support 17 is depressed it will be held in its cooking position by the electromagnet for cooking the eggs 19, and it will remain in this position until the time switch has returned the arm 24 to its zero or "off" position, at which time the electromagnet will be deenergized to permit the edible support to buoy up and remove the eggs from the cooking medium 11.

In Fig. 2, there is illustrated a modified form of edible support which is the same as the edible support 17 except that here the base 25 is formed of wood which is rendered resistant to hot water. The magnetic element of the support is in the form of a magnetic plate 26 inserted in the bottom of the wooden base 25, as shown.

While time element switches 23 have been shown as the controlling devices for the magnets 22, it will be understood that instead, simple manually operable "on and off" switches may be used. In this case it would be preferable to use a time-indicating device to assist the attendant in timing the cooking operation. In Fig. 3 there is illustrated such an arrangement, the manual switch being indicated by the numeral 27 and the time-indicating device by the numeral 28.

While I have shown particular embodiments of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent in the United States is:

1. A cooker comprising a cooking vessel for holding a cooking liquid, a buoyant edible support which when placed in said liquid holds the edible above the liquid level by its buoyancy, magnetic means comprising cooperative mutually attractive elements one of which is on said support and the other of which is located at the bottom wall of said vessel so as to hold said support in the lower part of said vessel to submerge the edible in the cooking liquid, and a manually settable clockwork mechanism controlling said other magnetic element to release the element on said support at the end of a predetermined time period.

2. A boiler for boiling eggs and the like comprising a vessel adapted to receive the cooking liquid, having a bottom wall formed of a nonmagnetic material, a buoyant float for supporting the eggs adapted to be placed in said vessel and to support the eggs above the level of the liquid, said support having a magnetic element, an electromagnet under the bottom wall of said vessel arranged when energized to hold said support at the bottom of said vessel in order to immerse the eggs by its attraction for said magnetic element, and a time element control device connected to said electro-magnet for deenergizing it at the end of a preselected timed cooking interval.

3. A boiler for boiling eggs and the like comprising a cooking liquid containing vessel having a bottom wall formed of a non-magnetic material, a buoyant egg support for floating on the level of the cooking liquid constructed and arranged to support the eggs above said level, a pair of cooperating magnetic elements that attract each other, one element being placed below said bottom wall and the other carried by said support, the elements holding said support against said bottom wall when it is depressed to the bottom wall, and a time element control device for controlling one of said magnetic elements to substantially demangetize it at the end of a preselected timed cooking period.

JOHN C. SHARP.